(12) United States Patent
Wang

(10) Patent No.: US 9,749,544 B2
(45) Date of Patent: Aug. 29, 2017

(54) GIMBAL DRIVING DEVICE AND GIMBAL ASSEMBLY USING THE SAME

(71) Applicant: SZ DJI TECHNOLOGY CO., LTD., Shenzhen (CN)

(72) Inventor: Yong Wang, Shenzhen (CN)

(73) Assignee: SZ DJI OSMO TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 15/126,493

(22) PCT Filed: Apr. 4, 2014

(86) PCT No.: PCT/CN2014/074855
§ 371 (c)(1),
(2) Date: Sep. 15, 2016

(87) PCT Pub. No.: WO2015/149370
PCT Pub. Date: Oct. 8, 2015

(65) Prior Publication Data
US 2017/0094185 A1    Mar. 30, 2017

(51) Int. Cl.
*H04N 5/232* (2006.01)
*H04N 5/225* (2006.01)
(Continued)

(52) U.S. Cl.
CPC ....... *H04N 5/23296* (2013.01); *F16M 11/123* (2013.01); *F16M 11/18* (2013.01);
(Continued)

(58) Field of Classification Search
CPC .... F16M 11/18; F16M 11/10; F16M 11/2014; F16M 11/123; F16M 11/2071;
(Continued)

(56) References Cited

U.S. PATENT DOCUMENTS 4,979,709 A   12/1990   Ishikawa
6,263,160 B1 *  7/2001   Lewis ................... G03B 15/00
                                                      248/550
(Continued)

FOREIGN PATENT DOCUMENTS

CN    201380965    1/2010
CN    202295294    7/2012
(Continued)

OTHER PUBLICATIONS

International Search Report mailed Jan. 21, 2015, in corresponding International Application No. PCT/CN2014/074855 issued by the State Intellectual Property Office of the P.R. China; 6 pages.
(Continued)

*Primary Examiner* — Michael Osinski
(74) *Attorney, Agent, or Firm* — Finnegan, Henderson, Farabow, Garrett & Dunner, L.L.P.

(57) ABSTRACT

The present invention relates to a gimbal driving device comprising a holding arm, a first motor, a connecting frame for fixing an imaging device, a connector and a flexible wiring board. The first motor may comprise a shaft, a rotor holder connected with the shaft, and a shaft cover fixed to the holding arm, wherein the shaft may bring the rotor holder into swinging; the connecting frame may be fixed to the rotor holder to bring the imaging device into swinging; the connector may be connected between the shaft and the connecting frame; and the flexible wiring board may have one end connected to the holding arm and the other end thereof connected to the connecting frame, wherein a length of the flexible wiring board may remain unchanged while the imaging device is swinging. The invention also relates to a gimbal assembly using the gimbal driving device.

10 Claims, 5 Drawing Sheets

(51) Int. Cl.
*F16M 13/02* (2006.01)
*F16M 11/18* (2006.01)
*F16M 11/12* (2006.01)

(52) U.S. Cl.
CPC .......... *F16M 13/02* (2013.01); *H04N 5/2252* (2013.01); *H04N 5/2253* (2013.01); *H04N 5/2254* (2013.01); *F16M 2200/06* (2013.01); *G03B 2205/0023* (2013.01); *G03B 2205/0069* (2013.01)

(58) Field of Classification Search
CPC ...... F16M 11/08; F16M 11/12; F16M 11/128; F16M 11/2021; F16M 11/2064; G03B 17/561; G03B 17/566; G03B 15/006; G03B 2205/0069; G03B 2205/0023; G08B 13/1963; G08B 13/19619; G08B 13/19632; G08B 13/19636; H04N 5/2252; H04N 5/2253; H04N 5/2251; H04N 5/2254; H04N 5/2257; H04N 5/23216
See application file for complete search history.

(56) References Cited

U.S. PATENT DOCUMENTS

| | | | | |
|---|---|---|---|---|
| 6,268,882 B1* | 7/2001 | Elberbaum | ...... | G08B 13/19619 348/143 |
| 6,628,338 B1* | 9/2003 | Elberbaum | ........ | G08B 13/1963 348/373 |
| 6,708,943 B2* | 3/2004 | Ursan | .................. | F16M 11/128 248/183.2 |
| 6,793,414 B2* | 9/2004 | Akada | .................... | H04N 5/232 348/143 |
| 8,167,506 B2* | 5/2012 | Martos | .................. | G03B 15/00 396/427 |
| 8,325,229 B2* | 12/2012 | Jones | .................... | G03B 17/00 348/143 |
| 8,442,392 B2* | 5/2013 | Ollila | ....................... | G03B 3/10 310/12.14 |
| 8,485,740 B1* | 7/2013 | Chapman | ............. | G03B 17/561 248/183.2 |
| 8,882,369 B1* | 11/2014 | Nelson | ................ | H04N 5/2252 396/427 |
| 9,280,038 B1* | 3/2016 | Pan | ...................... | G03B 17/561 |
| 9,527,588 B1* | 12/2016 | Rollefstad | ............. | B64C 39/024 |
| 9,561,870 B2* | 2/2017 | Zhou | ...................... | B64D 47/08 |
| 2001/0006218 A1* | 7/2001 | Takada | ............. | G08B 13/19619 250/551 |
| 2001/0045991 A1* | 11/2001 | Van Rens | .............. | F16M 11/08 348/373 |
| 2001/0055487 A1* | 12/2001 | Akada | .................... | H04N 5/232 396/427 |
| 2005/0088571 A1* | 4/2005 | Wei | ........................ | F16M 11/10 348/375 |
| 2006/0003604 A1* | 1/2006 | Angerpointner | ....... | H01R 39/08 439/13 |
| 2006/0216019 A1* | 9/2006 | Thompson | ............. | F16M 11/10 396/427 |
| 2006/0269278 A1* | 11/2006 | Kenoyer | ................ | F16M 11/10 396/428 |
| 2007/0110487 A1* | 5/2007 | Kim | ..................... | G03G 15/206 399/328 |
| 2007/0126871 A1* | 6/2007 | Henninger | ....... | G08B 13/19619 348/151 |
| 2007/0222329 A1* | 9/2007 | Bin | ........................ | H02K 3/525 310/257 |
| 2008/0062539 A1* | 3/2008 | Kato | ........................ | G02B 7/16 359/813 |
| 2008/0210025 A1* | 9/2008 | Goossen | .............. | F16M 11/041 74/5.34 |
| 2009/0216394 A1* | 8/2009 | Heppe | ..................... | B64C 39/024 701/16 |
| 2010/0067180 A1 | 3/2010 | Origuchi | | |
| 2011/0221900 A1* | 9/2011 | Reich | ..................... | F16M 11/18 348/144 |
| 2014/0037278 A1* | 2/2014 | Wang | ..................... | F16M 11/10 396/55 |
| 2014/0037281 A1* | 2/2014 | Carney | ................ | G03B 17/561 396/421 |
| 2015/0207964 A1* | 7/2015 | Bye | ....................... | H04N 5/2251 348/211.99 |
| 2016/0016674 A1* | 1/2016 | Zhao | ..................... | B64D 47/08 244/118.1 |
| 2016/0023778 A1* | 1/2016 | Zhao | ..................... | B64D 47/08 396/12 |
| 2016/0083110 A1* | 3/2016 | Pan | ...................... | G03B 17/561 348/144 |
| 2017/0089513 A1* | 3/2017 | Pan | ...................... | F16M 13/022 |
| 2017/0106998 A1* | 4/2017 | Zhou | ...................... | B64D 47/08 |

FOREIGN PATENT DOCUMENTS

| | | |
|---|---|---|
| CN | 202647108 | 1/2013 |
| CN | 203131382 | 8/2013 |
| CN | 103277640 | 9/2013 |
| CN | 203927268 | 11/2014 |
| JP | H 3-117986 | 12/1991 |
| JP | 2006-51892 | 2/2006 |
| JP | 2006-329215 | 12/2006 |
| JP | 2009-83841 | 4/2009 |

OTHER PUBLICATIONS

English-language extended Search Report from the European Patent Office in counterpart European Application No. EP 14 88 8293.9 mailed Mar. 17, 2017.

* cited by examiner

GIMBAL DRIVING DEVICE AND GIMBAL ASSEMBLY USING THE SAME

CROSS REFERENCE TO RELATED APPLICATIONS

This application is a national phase application of International Application No. PCT/CN2014/074855, filed Apr. 4, 2014, the content of which is incorporated herein by reference in its entirety.

TECHNICAL FIELD

The invention relates to camera equipment, and particularly to a gimbal driving device and a gimbal assembly using the same.

BACKGROUND OF THE INVENTION

A gimbal may be a support device on which a camera may be mounted and fixed, and the gimbal can be categorized into two types of fixed gimbal and motor-driven gimbal. A fixed gimbal may be applied to perform surveillance within a small range, in which case a yaw angle and a pitch angle of a camera may be adjusted by an adjusting mechanism after the camera is mounted on the gimbal, and the adjusting mechanism may be locked when an optimal working attitude of the camera is obtained. A motor-driven gimbal may be applied to perform scanning and surveillance in a wider range, thereby extending the range of surveillance performed by a camera.

At present, common gimbals are typically driven by brushless motors, such as brushless external-rotor motors. The brushless external-rotor motor is a type of motor in which a permanent magnet may rotate with a housing, and a winding may be fixed to a stator made up of silicon steel sheets. When an existing motor is applied to a small gimbal structure, a coupler and other structures may have to be designed to connect with a load since the overall structure of the motor has been fixed, leading to structural redundancy of the gimbal with drawbacks of a large axial size and structural complexity; accordingly, the design of wiring structures connected between various shafts of the gimbal may also be complex for maintaining an aesthetic appearance and satisfying requirements on angles of rotation of the shafts and positioning precision of the gimbal.

SUMMARY OF THE INVENTION

An object of the invention is to provide a gimbal driving device and a gimbal assembly using the same so as to address the technical problem of complex wiring in existing gimbal driving devices.

In one aspect, there is provided a gimbal driving device, comprising: a holding arm; a first motor comprising a shaft, a rotor holder connected with the shaft, and a shaft cover fixed to the holding arm, wherein the shaft may bring the rotor holder into swinging; a connecting frame for fixing an imaging device, wherein the connecting frame may be fixed to the rotor holder to bring the imaging device into swinging; a connector connected between the shaft and the connecting frame; and a flexible wiring board having one end connected to the holding arm and the other end connected to the connecting frame, wherein a length of the flexible wiring board may remain unchanged while the imaging device is swinging.

In some embodiments, the flexible wiring board may be a flexible circuit board.

In some embodiments, the holding arm may have a body portion and an extension arm extending from the body portion; the extension arm may be arranged perpendicular to the body portion; the connecting frame may comprise a first end and a second end arranged opposite to each other, the first end being fixedly connected to the rotor holder, and the second end being rotatably connected to the imaging device.

In some embodiments, a first receiving cavity may be provided at the first end, and a rotor of the first motor may be fixedly received in the first receiving cavity.

In some embodiments, the shaft may be fixed relative to the holding arm; the rotor holder may be rotatably connected with the shaft and integrally formed with a housing of the first motor.

In some embodiments, the gimbal driving device may further comprise a second motor; a second receiving cavity may be provided at the second end; and the second motor may comprise a stator fixedly received in the second receiving cavity and a rotor fixedly connected to the imaging device.

In some embodiments, a connecting hole may be provided on the shaft, and the connector may comprise a connecting pin passing through the connecting hole of the shaft and connected with the imaging device.

In some embodiments, a depth direction of the connecting hole may be perpendicular to an extending direction of the shaft.

In another aspect, there is provided a gimbal assembly, comprising: the gimbal driving device as described above; and an imaging device carried on the connecting frame.

In some embodiments, the imaging device may be a camera, a video camera or a camera lens.

As compared with the prior art, in the gimbal driving device and the gimbal assembly, by connecting one end of the flexible wiring board to the holding arm and the other end thereof to the connecting frame, and keeping the length of the flexible wiring board unchanged while the imaging device is swinging, the wiring of the gimbal driving device and the gimbal assembly may be shorter and easier to use; moreover, by integrating the motor and the connector onto the gimbal, the wiring design of the entire gimbal driving device and the gimbal assembly may be more compact.

BRIEF DESCRIPTION OF THE DRAWINGS

Drawing to which reference is made in the embodiments will be briefly described below to more clearly illustrate the technical solution of the present invention. It should be apparent that the drawings in the following description are merely illustrative of some embodiments of the invention, and those ordinarily skilled in the art can further derive from these drawings other drawings without any inventive effort. In the drawings.

DETAILED DESCRIPTION OF THE INVENTION

The technical solution according to the embodiments of the invention will be described below clearly and fully with reference to the drawings in the embodiments of the invention. It is apparent that the embodiments described herein are merely some but not all of the embodiments of the invention. All other embodiments that are derived by those skilled in the art based on the embodiments described herein without any inventive effort still fall within the claimed scope of the invention.

Figure 3:
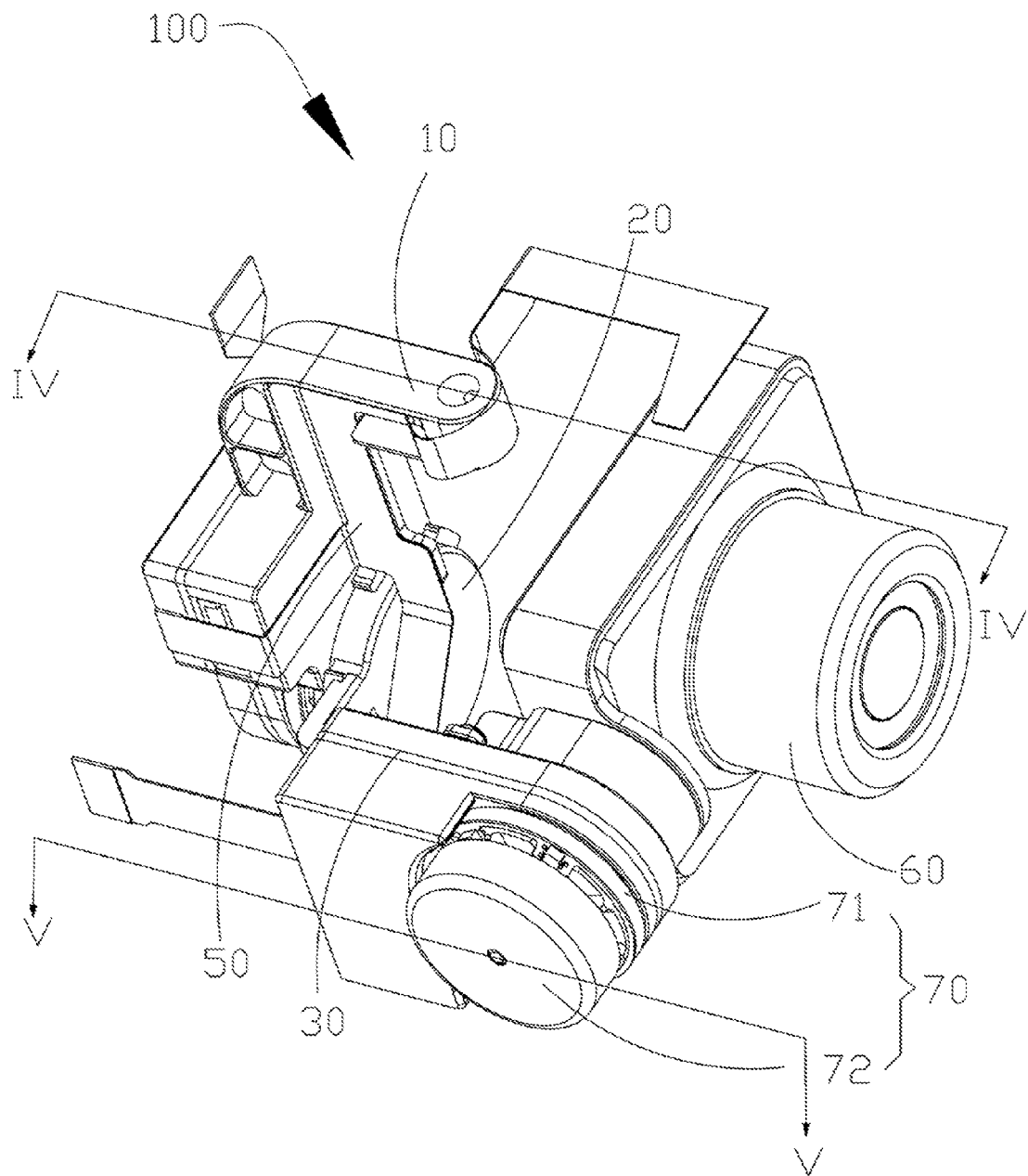
FIG. 3 is a three-dimensional structural diagram of the gimbal driving device and the gimbal assembly illustrated in FIG. 1 during the use thereof.
Figure 4:
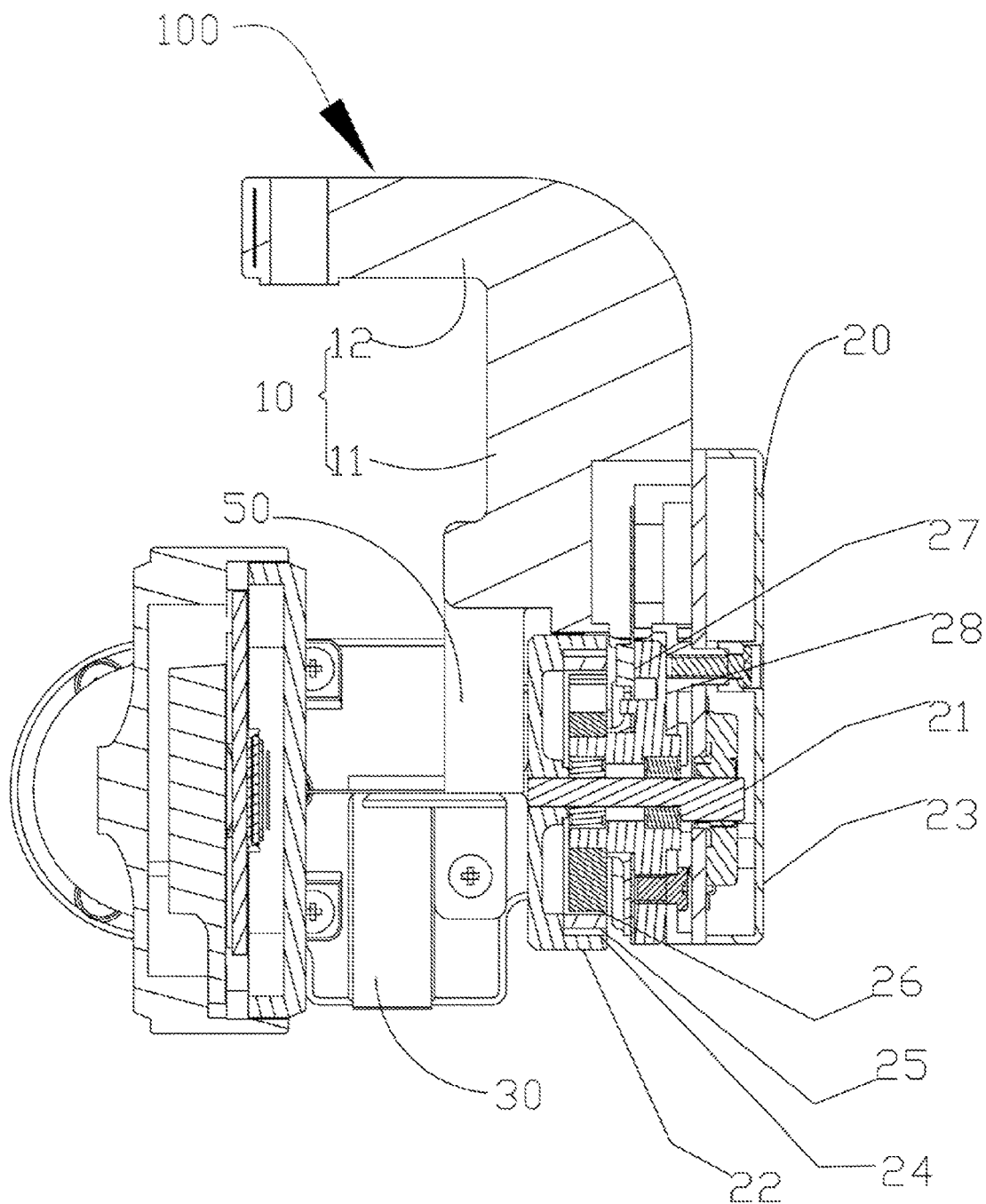
FIG. 4 is a sectional view of the gimbal driving device and the gimbal assembly illustrated in FIG. 1 from a first angle of view.

Referring to FIGS. 1 to 5, a gimbal driving device 100 provided by an embodiment of the invention may comprise a holding arm 10, a first motor 20, a second motor 70, a connecting frame 30 for connecting the first motor 20 with the second motor 70, a connector 40 (see FIG. 5 for details), and a flexible wiring board 50 (see FIGS. 3 and 4 for details).

Figure 1:
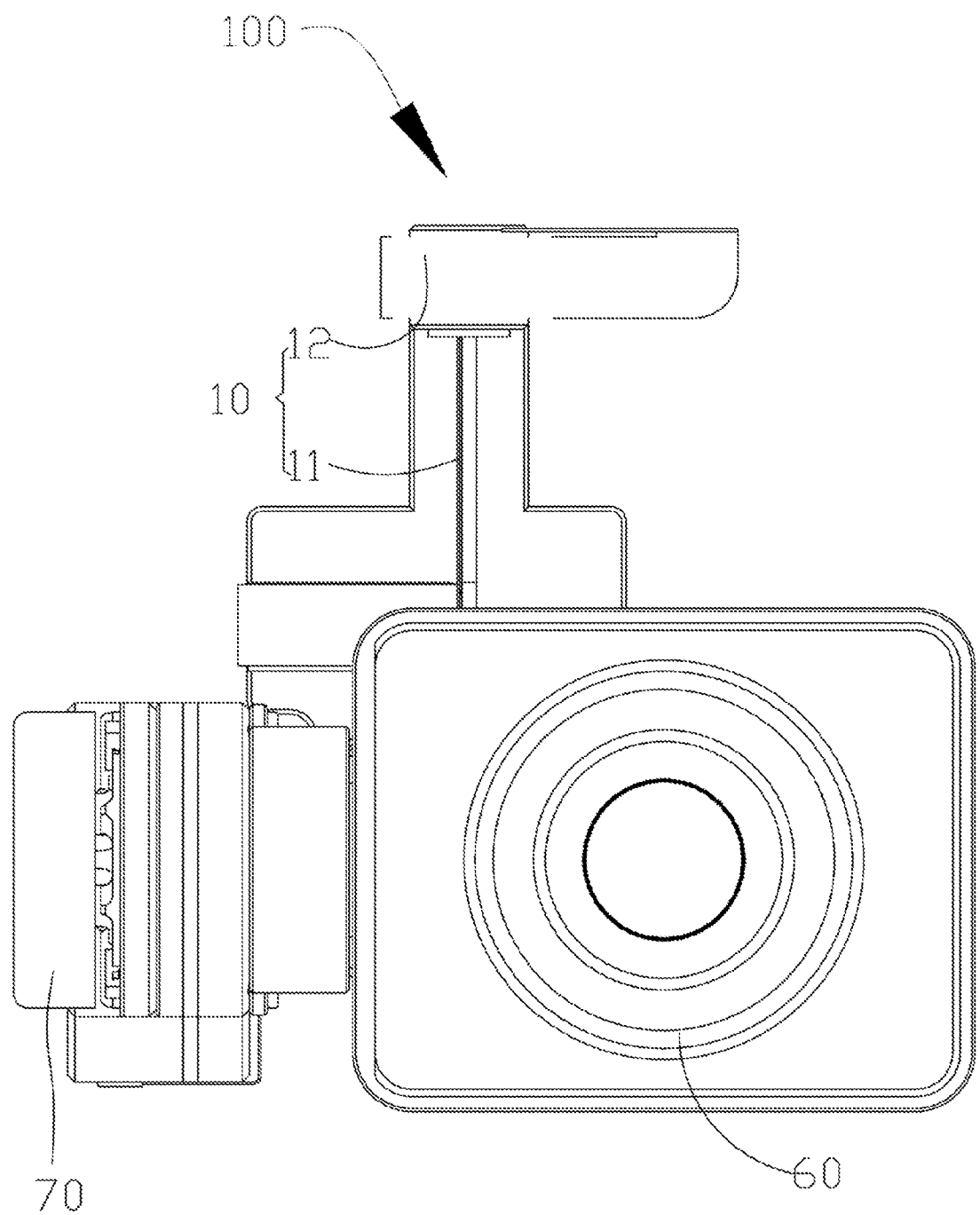
FIG. 1 is a front view of a gimbal driving device and a gimbal assembly provided by the invention.
Figure 2:
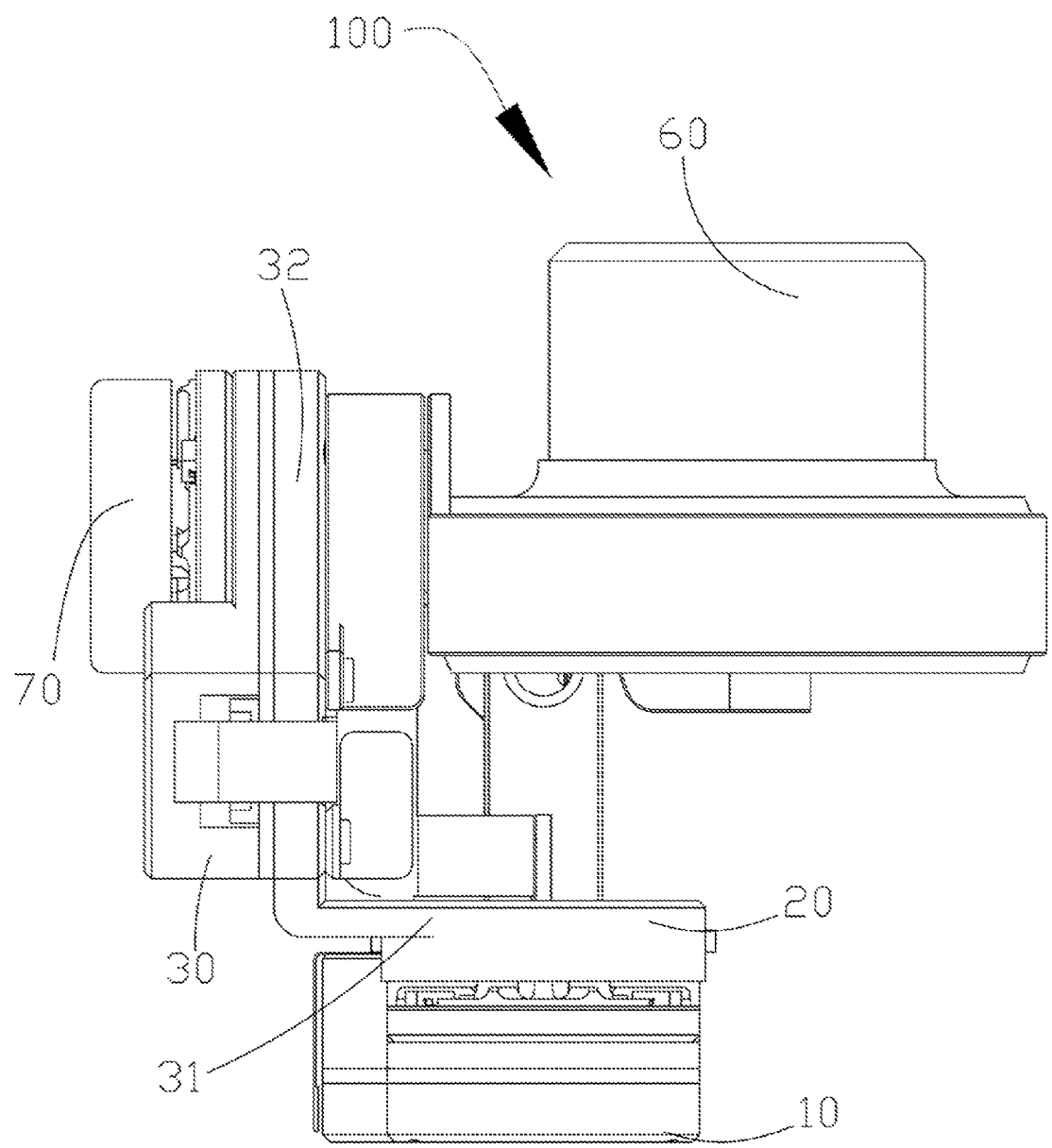
FIG. 2 is a schematic diagram of the gimbal driving device and the gimbal assembly illustrated in FIG. 1 from another angle of view.

As illustrated in FIG. 1, the holding arm 10 may have a body portion 11 and an extension arm 12 extending from the body portion 11. Particularly, in some embodiments, the extension arm 12 may extend from an end of the body portion 11. The extension arm 12 may be arranged substantially perpendicular to the body portion 11.

In some embodiments, the first motor 20 may comprise a shaft 21, a rotor holder 22, a shaft cover 23, a magnet concentrating flux ring 24, a motor magnet 25, a silicon steel stator 26, a circuit board 27 and a stator holder 28.

As illustrated in FIG. 4, the shaft 21 may be stationary relative to the holding arm 10, i.e., it may be fixed relative to the holding arm 10. The rotor holder 22 may be rotatably connected with the shaft 21, and the shaft cover 23 may be fixed to the holding arm 10. Upon assembling, the shaft 21 may be received in the rotor holder 22, the magnet concentrating flux ring 24 may be pressed firmly into the rotor holder 22, and the motor magnet 25 may be combined with the magnet concentrating flux ring 24 to form a permanent magnetic portion of the first motor 20. In some embodiments, the stator holder 22, the magnet concentrating flux ring 24 and the motor magnet 25 may be fixed to each other, thereby forming a rotor portion of the first motor 20. The stator holder 28 may be configured to mount the silicon steel stator 26 and the circuit board 27. In use, the stator holder 28 may mate with the periphery of the bearing, and the shaft 21, the silicon steel stator 26, the circuit board 27 and the stator holder 28 may be combined to form a stator portion of the first motor 20. In some embodiments, the rotor holder 22 may be integrally formed with a housing of the first motor 20 (i.e., the two being an integral structure).

Figure 5:
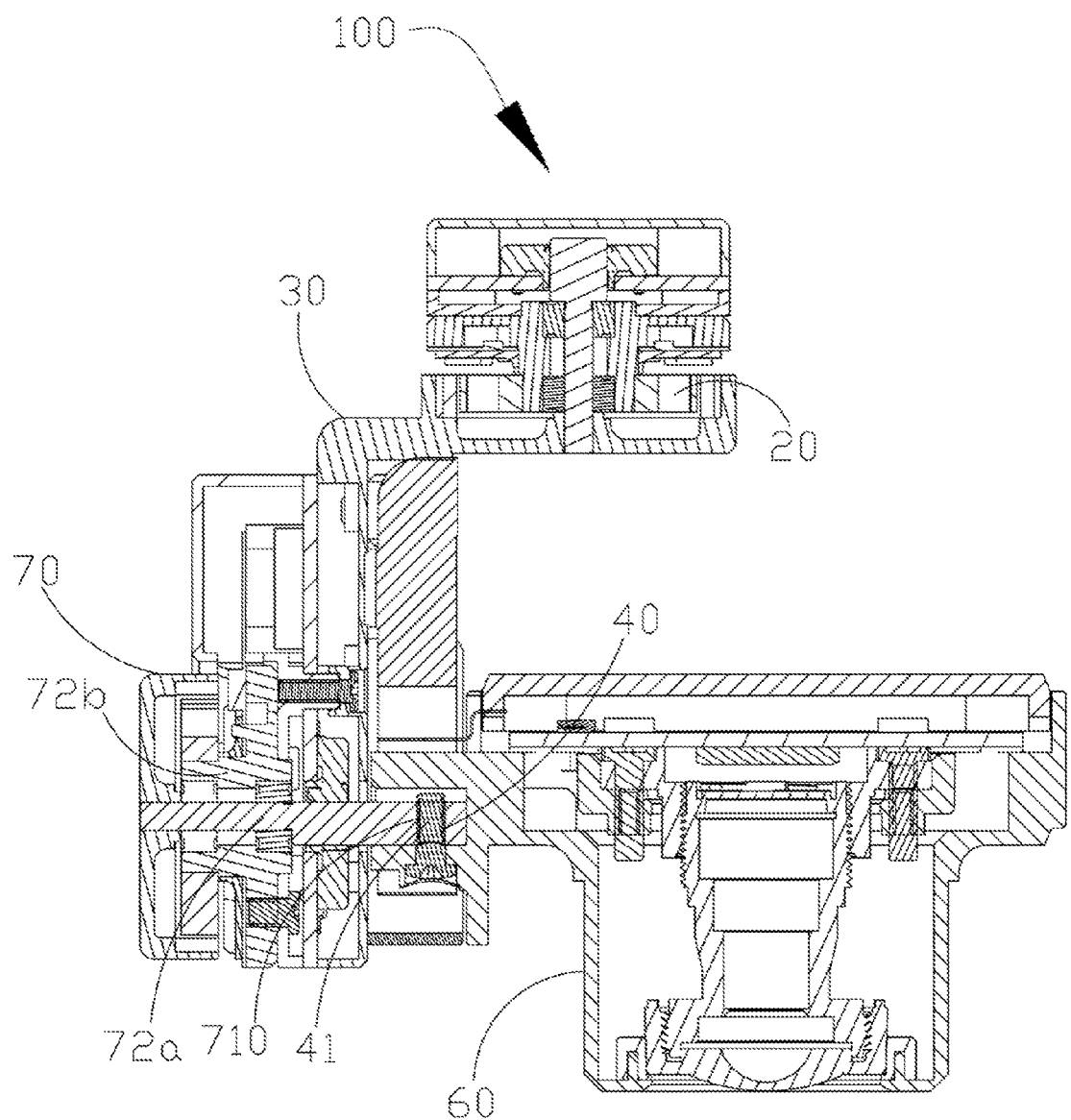
FIG. 5 is a sectional view of the gimbal driving device and the gimbal assembly illustrated in FIG. 1 from a second angle of view.

The connecting frame 30 may comprise a first end 31 and a second end 32 located on opposite sides thereof, where the first end 31 may be fixedly connected to the rotor holder 22, and the second end 32 may be rotatably connected to an imaging device 60. In some embodiments, the connecting frame 30 may be L-shaped. A first receiving cavity (not illustrated) may be provided at the first end 31, and the housing of the first motor 20 may be integrally formed with the first end 31. A second receiving cavity (not illustrated) may be provided at the second end 32. The rotor of the first motor 20 may be fixedly received in the first receiving cavity. The second motor 70 may be substantially the same as the first motor 20. The second motor 70 may comprise a stator 71 and a rotor 72 (as illustrated in FIG. 5). The stator 71 of the second motor 70 may be fixedly received in the second receiving cavity. The rotor 72 of the second motor 70 may comprise a shaft 72a and a rotor holder 72b. The rotor holder 72b of the second motor 70 may be sleeved on the shaft 72a of the second motor 70. In some embodiments, the first end 31 may be rotatably connected with the holding arm 10 through the first motor 20, the second end 32 may be configured to fix the stator 71 of the second motor 70, and the rotor 72 of the second motor 70 may be fixedly connected to the imaging device 60. The second motor 70 may drive a rotation of the imaging device 60. During operation, the rotor of the first motor 20 may bring the connecting frame 30 into rotation, and the second motor 70 mounted at the second end 32 of the connecting frame 30 may rotate therewith to thereby achieve a roll motion of the imaging device 60. The rotor 72 of the second motor 70 may bring the imaging device 60 into rotation to thereby achieve a pitch motion of the imaging device 60.

In some embodiments, in use, the connecting frame 30 may fix the imaging device 60. The connecting frame 30 may be fixed to the rotor holder 22. In some embodiments, during the roll motion of the imaging device 60, the imaging device 60 and the rotor holder 22 may rotate together relative to the shaft 21 and the holding arm 10.

As illustrated in FIG. 5, the connector 40 may be connected between the shaft 72a of the second motor 70 and the connecting frame 30. Particularly, in some embodiments, a connecting hole 710 may be provided on the shaft 72a of the second motor 70, and the connector 40 may comprise a connecting pin 41 passing through the connecting hole 710 of the shaft 72a of the second motor 70 and connected with the imaging device 60. In some embodiments, a depth direction of the connecting hole 710 may be perpendicular to an extending direction of the shaft 21.

The second motor 70 may be configured to adjust a pitch angle of the imaging device 60. An axial direction of the second motor 70 may perpendicularly intersect with an axial direction of the first motor 20. Of course, in other embodiments, an angle between the axial directions of the second motor 70 and the first motor 20 may also be an acute or obtuse angle.

In some embodiments, the flexible wiring board 50 may be a flexible circuit board as illustrated in FIG. 4. One end of the flexible wiring board 50 may be connected to the first motor 20 mounted on the body portion 11 of the holding arm 10, with the other end connected to the connecting frame 30 and electrically connected with the second motor 70 for transmitting control signals to the second motor 70 to control a rotation of the second motor 70, thereby enabling adjustment of the pitch angle of the imaging device 60. A length of the flexible wiring board 50 may remain unchanged while the imaging device 60 is swinging. In some embodiments, the flexible wiring board 50 may be led from the imaging device 60, affixed to the lower side of the rotor holder 22 after passing through the shaft 21, and then connected to the body portion 11 of the holding arm 10. The flexible wiring board 50 may be formed in a pendulum-like wiring pattern, which may be short while not affecting a rotation of the holding arm 10. The term "pendulum-like wiring pattern" may mean that the flexible wiring board 50 may be flexed clockwise or counterclockwise within a certain angle while the length thereof may remain unchanged during the swinging of the imaging device 60. In use, the first motor 20 may bring the connecting frame 30 and the imaging device 60 held thereon into swinging around the shaft 21 to thereby adjust the pitch angle at which the imaging device 60 performs photography.

In some embodiments, in the gimbal driving device 100, by connecting one end of the flexible wiring board 50 to the holding arm 10 and the other end thereof to the connecting frame 30, and keeping the length of the flexible wiring board 50 unchanged while the imaging device 60 is swinging, the wiring of the gimbal driving device 100 may be shorter and easier to use; moreover, by integrating the first motor 20 and the connector 40 onto the gimbal, the wiring design of the entire gimbal driving device 100 may be more compact.

Referring again to FIGS. 1 to 5, a gimbal assembly provided by some embodiments of the invention may comprise a holding arm 10, a first motor 20, a connecting frame 30 for fixing a camera, a connector 40 (see FIG. 5 for details), a flexible wiring board 50 (see FIGS. 3 and 4 for details), and an imaging device 60 carried on the connecting frame 30.

In some embodiments, the connecting frame 30 may be configured to carry the imaging device 60. The imaging device 60 may be a camera or a video camera. Of course, in other embodiments, the imaging device 60 may also be another imaging device such as a camera lens or the like. The other components of the gimbal assembly including the holding arm 10, the first motor 20, the connector 40 and the flexible wiring board 50 and their connection relationships have already been described in the aforementioned embodiments of the invention and thus are not described herein.

In the gimbal assembly, by connecting one end of the flexible wiring board 50 to the holding arm 10 and the other end thereof to the connecting frame 30, and keeping the length of the flexible wiring board 50 unchanged while the imaging device 60 is swinging, the wiring of the gimbal driving device 100 may be shorter and easier to use; moreover, by integrating the first motor 20 and the connector 40 onto the gimbal, the wiring design of the entire gimbal assembly may be more compact.

The foregoing disclosure is merely illustrative of the preferred embodiments of the invention, and it should be noted that those ordinarily skilled in the art may contemplate many modifications and variations without departing from the principles of the invention, and those modifications and variations shall also be regarded as falling into the scope of the invention.

What is claimed is:

1. A gimbal driving device, comprising:
   a holding arm;
   a first motor comprising a shaft, a rotor holder connected with the shaft, and a shaft cover fixed to the holding arm, wherein the shaft enables the rotor holder to execute a swinging motion;
   a connecting frame for fixing an imaging device, wherein the connecting frame is fixed to the rotor holder to enable the imaging device to execute a swinging motion;
   a connector connected between the shaft and the connecting frame; and
   a flexible wiring board having one end connected to the holding arm and the other end connected to the connecting frame, wherein a length of the flexible wiring board remains unchanged while the imaging device is executing the swinging motion.

2. The gimbal driving device according to claim 1, wherein the flexible wiring board is a flexible circuit board.

3. The gimbal driving device according to claim 1, wherein the holding arm has a body portion and an extension arm extending from the body portion; the extension arm is arranged perpendicular to the body portion; the connecting frame comprises a first end and a second end arranged opposite to each other, the first end being fixedly connected to the rotor holder, and the second end being rotatably connected to the imaging device.

4. The gimbal driving device according to claim 1, wherein a first receiving cavity is provided at the first end, and a rotor of the first motor is fixedly received in the first receiving cavity.

5. The gimbal driving device according to claim 4, wherein the shaft is fixed relative to the holding arm; the rotor holder is rotatably connected with the shaft and is integrally formed with a housing of the first motor.

6. The gimbal driving device according to claim 4, wherein the gimbal driving device further comprises a second motor; a second receiving cavity is provided at the second end; and the second motor comprises a stator fixedly received in the second receiving cavity and a rotor fixedly connected to the imaging device.

7. The gimbal driving device according to claim 6, wherein the rotor of the second motor comprises a shaft and a rotor holder; the rotor holder of the second motor is sleeved on the shaft of the second motor; a connecting hole is provided on the shaft, and the connector comprises a connecting pin passing through the connecting hole of the shaft and connected with the imaging device.

8. The gimbal driving device according to claim 7, wherein a depth direction of the connecting hole is perpendicular to an extending direction of the shaft.

9. A gimbal assembly, comprising:
   the gimbal driving device according to claim 1; and
   an imaging device carried on the connecting frame.

10. The gimbal assembly according to claim 9, wherein the imaging device is a camera, a video camera or a camera lens.

* * * * *